United States Patent [19]
Louis et al.

[11] Patent Number: 5,287,121
[45] Date of Patent: Feb. 15, 1994

[54] INTEGRATING GRAPHICS INPUT DEVICE

[76] Inventors: William M. Louis, 543 Cerro St.; Telford L. Dorr, 1438 Pegaso St., both of Encinitas, Calif. 92024

[21] Appl. No.: 968,468

[22] Filed: Oct. 29, 1992

Related U.S. Application Data

[63] Continuation of Ser. No. 828,771, Jan. 30, 1992, abandoned, which is a continuation of Ser. No. 439,278, Nov. 20, 1989, Pat. No. 5,132,671.

[51] Int. Cl.⁵ .............................................. G09G 3/02
[52] U.S. Cl. ................................. 345/179; 345/156; 345/157; 178/18; 178/19
[58] Field of Search ............... 178/18, 19; 340/706, 340/709, 707; 338/131, 133, 48; 345/156, 157, 179

[56] References Cited

U.S. PATENT DOCUMENTS

| | | | |
|---|---|---|---|
| 4,227,044 | 10/1980 | Fenci | 178/19 |
| 4,246,452 | 1/1981 | Chandler | 200/5 |
| 4,313,113 | 1/1982 | Thornburg | 340/709 |
| 4,465,908 | 8/1984 | Griffith et al. | 200/6 |
| 4,550,316 | 10/1985 | Whetstone et al. | 340/709 |
| 4,575,580 | 3/1986 | Jandrell | 178/18 |
| 4,580,006 | 4/1986 | Hull | 178/18 |
| 4,639,547 | 1/1987 | Jacob-Grinshge | 178/18 |
| 4,654,647 | 3/1987 | Wedam | 340/709 |
| 4,780,707 | 10/1988 | Selker | 340/706 |
| 4,782,335 | 11/1988 | Gussin | 340/709 |
| 4,856,785 | 8/1989 | Lantz et al. | 340/709 |
| 4,947,156 | 8/1990 | Sato et al. | 340/707 |
| 4,992,630 | 2/1991 | Hletzko | 340/711 |
| 5,012,230 | 4/1991 | Yasuda | 340/709 |

FOREIGN PATENT DOCUMENTS

| | | |
|---|---|---|
| 84077208 | 8/1984 | Denmark. |
| 58-201132 | 5/1982 | Japan. |
| 57-103607 | 6/1982 | Japan. |
| 59-36843 | 8/1982 | Japan. |
| 57-191868 | 11/1982 | Japan. |
| 59-170930 | 3/1983 | Japan. |
| 59-186035 | 4/1983 | Japan. |
| 59-205637 | 5/1983 | Japan. |
| 59-206932 | 5/1983 | Japan. |
| 59-206933 | 5/1983 | Japan. |
| 60-75929 | 10/1983 | Japan. |

OTHER PUBLICATIONS

Jan., 1984 Creative Computing, last paragraph re Robo Stick.
IBM Technical Disclosure Bulletin, vol. 27, No. 10B, Mar. 1985, "Joystick Alternative to Cursor Control Keys" pp. 6209-6210.
Xerox Disclosure Journal, vol. 1, No. 2, Feb. 1976, "Semi-Captive Keyboard", By D. C. Kowalski.

*Primary Examiner*—Ulysses Weldon
*Assistant Examiner*—Matthew Luu
*Attorney, Agent, or Firm*—Baker, Maxham, Jester & Meador

[57] ABSTRACT

A graphics input device for use with a graphics processing system includes a stylus which can be manually manipulated by a user to generate graphics input signals representative of a graphics object to be drawn in a circumscribed area on a display device controlled by the graphics processing system. The graphics input device also includes a grip which can be manually manipulated by the user to generate positioning signals for repositioning the circumscribed area on the display.

10 Claims, 8 Drawing Sheets

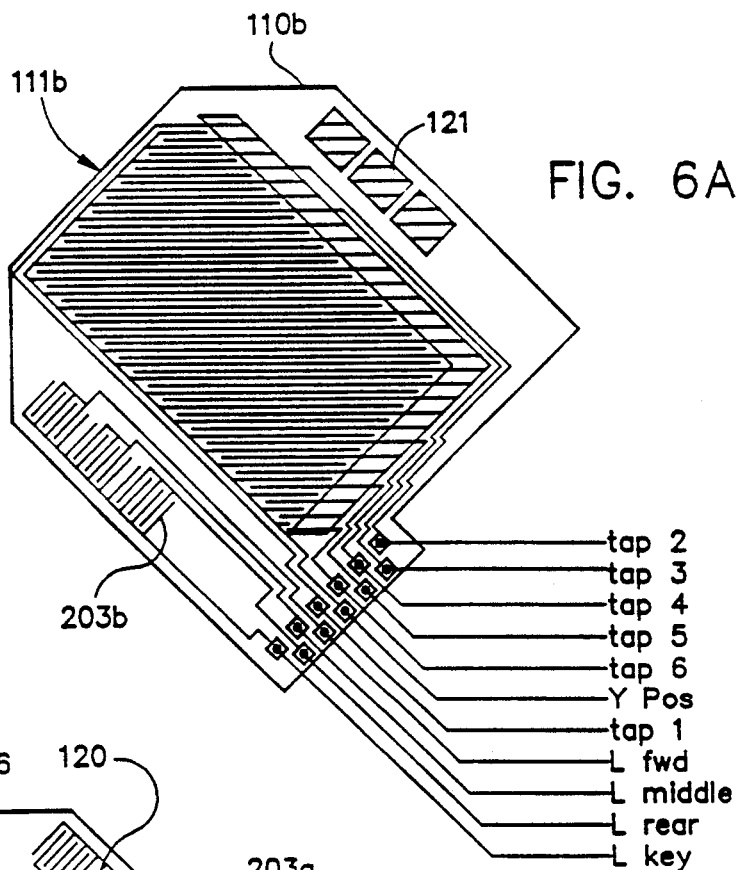
FIG. 6A
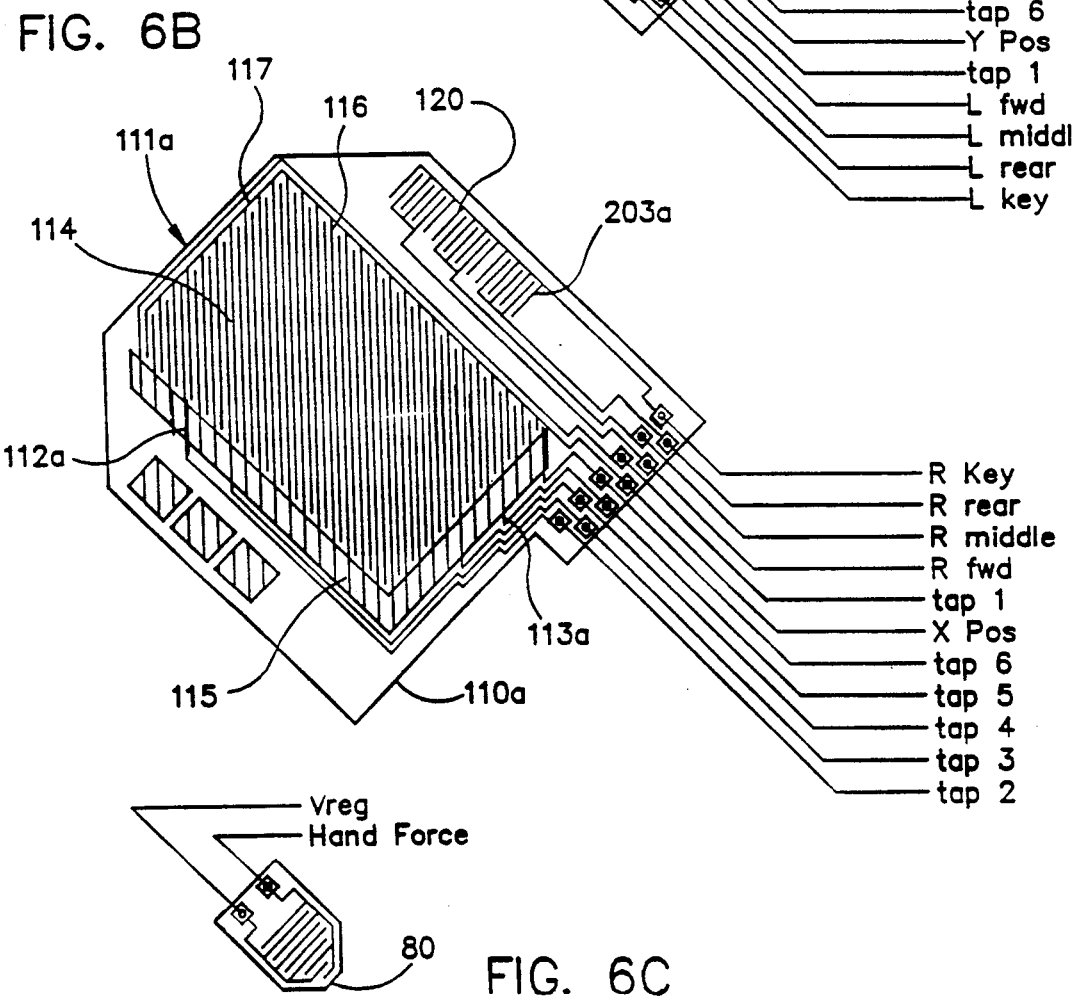
FIG. 6B
FIG. 6C

INTEGRATING GRAPHICS INPUT DEVICE

This is a continuation of application Ser. No. 07/828,771 filed Jan. 30, 1992, which is a continuation of application Ser. No. 07/439,278, filed Nov. 20, 1989 now U.S. Pat. No. 5,132,600.

BACKGROUND OF THE INVENTION

The invention relates to graphics input devices which are operated manually by a user to provide signals defining a graphical object whose image is to be displayed in a graphics system.

In the prior art, hand-operated pointing or picking devices are known. These devices are operated by a user to position a cursor on the screen of a graphical output device such as a display. The primary role of these devices is to permit a user to select a specific XY location on a display screen. Other devices, called locator devices, include the tablet, the mouse, the trackball, and the joystick. All of these devices are employed to move a screen cursor, and operate in combination with separate devices which input information relevant to the location occupied by the cursor. Most commonly, function buttons, function switches, or alpha-numeric keyboards are used for command or information entry after positioning of a cursor.

In the prior art, the drawing of graphic objects has been the province of a program entered into a graphics processor. Commonly, such an application program utilizes a bottom-up procedure for object creation, using hierarchially-arranged object components. The components map to a set of output primitives with master coordinates which are used to control the function of an output device, such as a display.

Free-hand creation of graphical objects by a user currently is supported by complicated devices having large drawing surfaces upon which the user moves a stylus or pen to draw an image. The drawing surface is related to the display surface by a dedicated applications process which maps the drawing surface to the display area. When the drawing is being made on the drawing surface, a conversion function is invoked, dispatching the application program, and converting the drawing into an image which is displayed on the screen of the display device.

The invention has the objective of providing a user with a graphics input device which permits the display device of a graphics processing system to be used like a drawing surface, without the need to provide a physical surface as an analog to the display surface. This permits a graphics processor system to provide to a user immediate feedback, or echoing, of a drawing operation which the user is conducting. Thus, the display screen of a CRT may be used much as a blank tablet upon which a user can draw.

The integrating graphics input device which has been invented by the applicants provides hand-to-eye feedback through a graphics processor system by combining cursor-like movement of a position area on a display surface, together with tablet-like entry of graphical image information by means of a stylus which can be manipulated by the user to draw within the located positioned area. The device can be used to enter a continuous image by successively relocating the position area in a sequence of overlapping positions within which the user's manual input is integrated to form a continuous, coherent image.

The closest prior art to this device is the inventor's integrating pointing device, described in U.S. Pat. No. 4,719,455 which is incorporated herein by reference. In that device, graphical input was provided by a hand-manipulated device which fit to the user's hand. In the device, gross and fine control of cursor position were generated, respectively, by a moveable cover and a moveable puck contained within the cover.

SUMMARY OF THE INVENTION

The invention is an apparatus for use in a graphics processing system in which a graphics processor responds to graphics input signals descriptive of a graphics object by operating a graphics output device to display an image of the object. The apparatus provides to the graphics processor graphics input signals descriptive of the graphics object. The apparatus includes a manually operable finger grip assembly with a first pressure sensor for providing pressure-generated, force vector signals representing a display location on the graphics output device. A pressure-responsive lockout switch assembly generates a lockout signal. The lockout signal is for indicating inactivation of the force vector signals. In the apparatus, a stylus assembly is moveable in two dimensions and has a position sensor for generating graphics input signals representing a multi-dimensional portion of a graphics object which is to be displayed at the indicated display location. An interface is connected to the finger grip assembly, to the pressure-response switch assembly, and to the stylus assembly for receiving the force vector signals, the lockout signal and the graphics input signals. Last, a processor communicator connected to the interface means communicates to the graphics processor display location signals representing an updated position for the location in response to the force vector signals received by the interface, the lockout signal, and graphic input signals representing the graphic object to be displayed in the updated position.

The principal object of this invention is to provide a graphics input device which integrates graphics input position information and graphics object information which is to be input at the indicated position.

It is the further object of this invention to provide repositioning control of a position area displayed by a graphics processor.

A further objective is to also provide graphics object input signals defining a portion of an image which is to be displayed in the position area.

Other objectives and attendant advantages of this invention will become manifest when the following detailed description is read with reference to the below-described drawings.

BRIEF DESCRIPTION OF THE DRAWINGS

FIGS. 6A, 6B, and 6C illustrate the sensors used to provide graphics object force vector, and lockout signals in the device of FIG. 1.

DETAILED DESCRIPTION OF THE PREFERRED EMBODIMENT

Figures 1, 3:
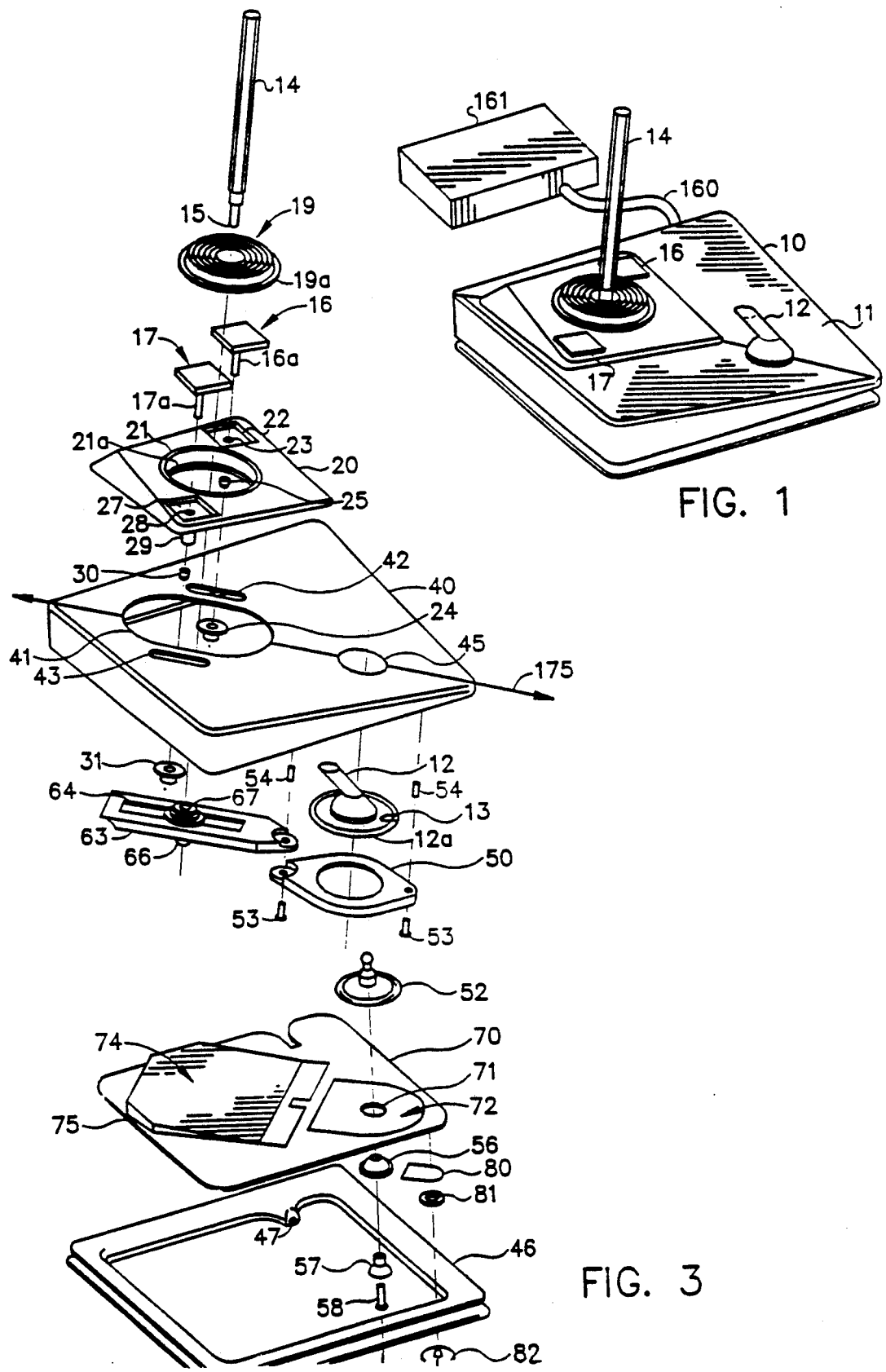
FIG. 1 is an isometric perspective view of the integrating graphics input device.
FIG. 3 is an exploded assembly diagram of the device of FIG. 1.
Figure 2:
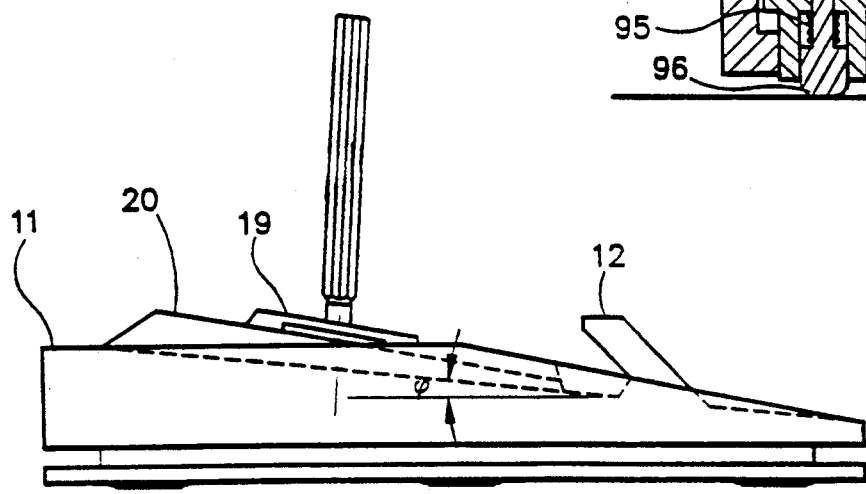
FIG. 2 is a side-view of the device illustrated in FIG. 1.

The integrating graphics input device of the invention is illustrated in external perspective in FIG. 1 and in a slightly magnified side elevation of FIG. 2. The device is indicated by reference numeral 10 and includes a case 11 in which is mounted a finger grip 12, a stylus-like pen 14, and function keys 16 and 17.

The device 10 is a stationary apparatus which a user manipulates by hand to enter position and graphics objects information in the form of hand force and position signals, respectively, into a graphics processor for display. In use, the user grasps the finger grip 12 to change the location of a position area on a graphics processor display. The grip 12 is operated like a stationary joystick to support cursor-like repositioning of the display area.

When the position area is relocated as just described, the user grasps the pen 14 and manipulates it in the X and Y directions to draw in the position area. The pen 14 is free to move in two dimensions, its movements being translated, by means described below, into graphics object input signals which are used by a graphics processor to display the trace of the pen's path in the display area. The pen 14 also permits the operator to enter Z-axis information by varying pressure on the pen 14. The result, for example, would be to vary the width or density of a line being drawn.

The function keys 16 and 17 provide conventional, programmable functions which are selected by the user depressing one or the other of the keys.

Figure 4:
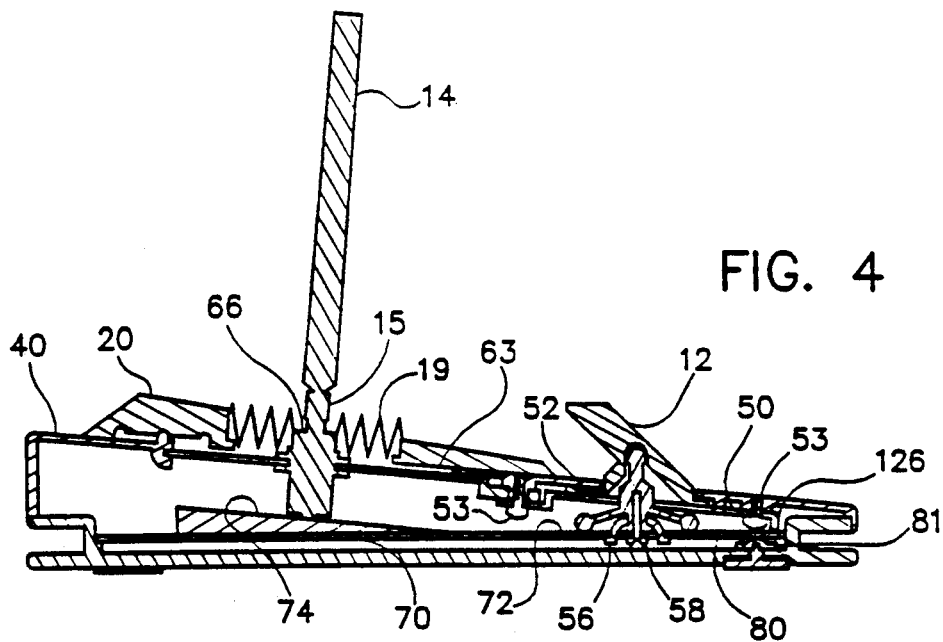
FIG. 4 is an elevational side sectional view of the device of FIG. 1, the view being taken along line 175 of FIG. 3.

The construction details of the device 10 are illustrated in FIGS. 3 and 4. As shown in the Figures, the case 11 is assembled from a carriage 20, which fits to a case top 40. The case top 40 is attached to the case bottom 46; a circuit board 70 is positioned between the case top and the case bottom and attached to the case bottom.

The stylus 14 includes a tip 15 which fits through a boot 19 having a rim 19a. The boot 19 is inserted into a circular opening 21 in the carriage 20, with the rim 19a engaged in an annular groove 21a of the carriage opening. The keys 16 and 17 are mounted to the carriage 20, with the right-hand key 16 received in a quadrilateral recess 22 having a hole 23. The key 16 includes a rod 16a which fits through the hole 23 and a stylus 25. Similarly, the left-hand key 17 has a key rod 17a and is received in a quadrilateral recess 27 of the carriage. The key rod 17a extends through a hole 28 and rod guide 29. The bottom of the rod 17a fits into the stylus 30.

As thus described, the keys are held to the carriage 20 by engagement of the tips of the rod 16a and 17a in the styli 25 and 30. The styli 25 and 30 are received in slots 42 and 43, respectively, and are held therein by retainers 24 and 31.

With the carriage 20 aligned, by way of the slots 42 and 43 with the case top 40, and held to it by the retainers 24 and 31, the opening 20 is aligned with an oval opening 41 in the case top 40. The tip 15 of the stylus 14 extends through the oval opening 41.

A circular opening 45 in the case top receives the upper portion of the finger grip 12. The finger grip 12 is retained against the case top 40 by a grip retainer 50. The annular extension 12a of the finger grip 12 has a larger radius than the hole 45, and is sandwiched between the case top 40 and the retainer 50. The retainer is attached to the case top 40 by screws 53 which are received in threaded bosses 54. The bosses are formed as part of the case top 40; however, for clarity, they are shown detached from the top. A disk lever 52 engages a recess in the shaft of the finger grip 12 and is positioned between the finger grip 12 and the circuit board 70 by a pivot 56 with an annular extension, which fits through a hole 71 in the circuit board. An anchor 57 extends through the bottom of the pivot 56 and contacts the bottom of the disk lever 52, and is retained there by a threaded screw 58 which is screwed into a threaded recess in the center of the disk lever 52.

The pen 14 is retained in an elongate slide 63 which is clamped pivotally between the grip retainer 50 and the case top 40 by one of the threaded screws 53. The tip 15 of the stylus 14 is received in a tip retention recess 67 in the top portion of a rounded slider 66 having two coaxial flanges which slidably engage respective faces of the slotted elongate slide 63. The slider 66 is free to slide in the slot 64 while the pen tip 15 is engaged in the recess 67.

The circuit board 70 has a force sensor 72 in the form of a force sensing resistor upon which the lower edge of the rim of the disk lever 52 rests. Forward of the sensor 72 is a ramped surface 75 on which is held a position sensor 74. A hand pressure sensor 80 is positioned on the bottom of the circuit board 70 and contacted by a button 81 on a threaded foot 82. All of the sensors are attached by adhesive means to the circuit board 70.

Figure 5:
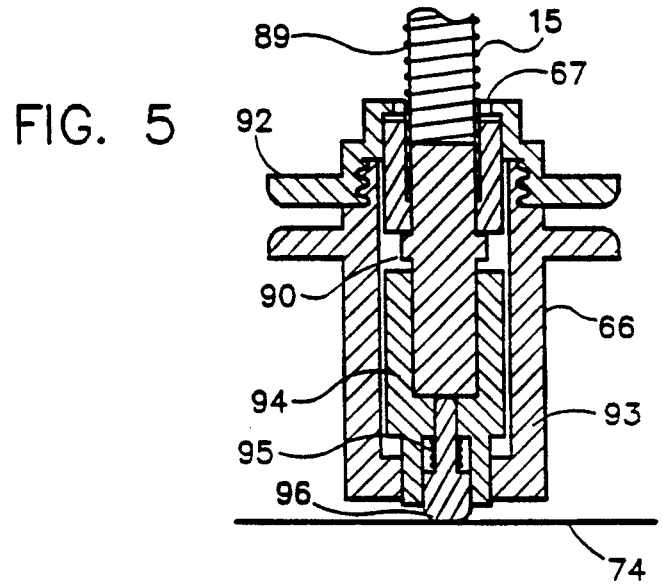
FIG. 5 is a magnified, side sectional view of a stylus slider in the device of FIG. 1.

The tip of the round slider 66 is illustrated in a magnified cross-section in FIG. 5. FIG. 5 illustrates the connection of the stylus 14 to the slider 66. The stylus is connected to the slider by a spring 89, one end of which receives the tip 15 of the stylus. The spring 89 allows the user to hold the stylus at any desired angle. The round slider 66 is a hollow cylinder in which the other end of the spring 89 is retained in the tip retention recess 67. The spring 89 has a flanged tip extension 90 which is in bayonet engagement with a slider plug 94. The slider plug 94 is moveably held within the slider, so that it can rotate, allowing the user to turn the attached stylus 14 to any desired orientation, and it can also move up and down, in response to upward pressure by a spring 95 and varying downward pressure by the user on stylus 14. As shown, the plug 94 is bored out to contain the tip 15 in an upper bore, as well as a tip 96 which is spring-loaded by the spring 95 in a lower bore. The tip 96 includes a rod which can project into the upper bore of the slider plug 94. The upper end of the tip 96 contacts the lower end of the tip 15 when the spring 95 is compressed by the user pressing down on the stylus 14. When this happens, there is a direct transfer of force from the stylus 14 to the tip 96, as shown in FIG. 5.

FIG. 5 illustrates partial compression of the spring 97 when the tip 15 is pressed with moderate force downwardly toward the slider 66. As illustrated., the pivot of slide 63, together with the slider 66 which moves in the slot 64, enables the tip 96 to move under the force of the pen 14 over the position sensor 74. When assembled, the tip 96 rests on the position sensor. Movement of the pen 14 moves the tip 96 upon the sensor 74, with more or less pressure according to the force exerted against the tip of the pen by the user. Even with no pressure exerted by the user in the stylus, the spring 95 maintains the tip 96 against the sensor 74 with enough force to track the position of the stylus.

Figure 7:
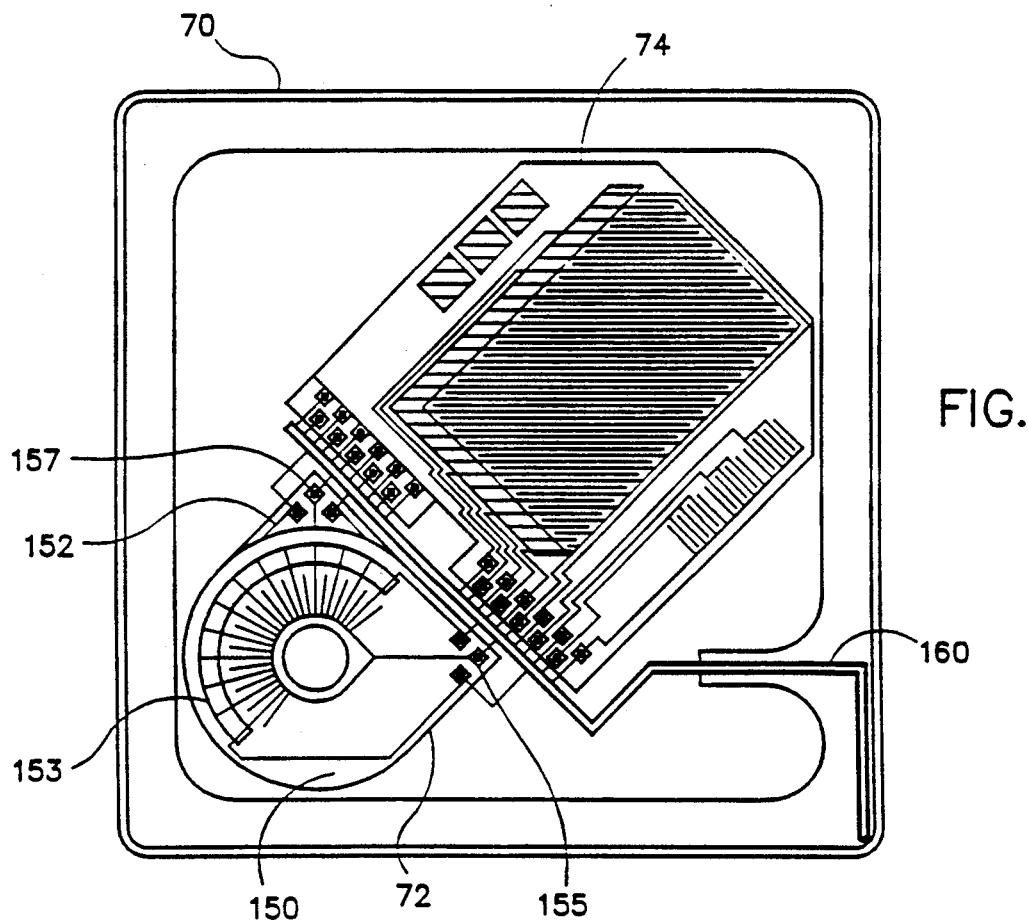
FIG. 7 is a top plan view illustrating a circuit board included in the assembly of the device of FIG. 1.

The position sensor 74 is illustrated unassembled in FIG. 6A and 6B. As shown, sensor FSR 74 consists of two thin, rigid, plastic sheets 110a and 110b, each carrying a pattern of printed conductive traces and a variable resistance compound. The sheets are identical images, and form the sensor 74 by being assembled with an insulating sheet between them. When assembled, opposite sides of the sheets 110a and 110b face upward. The assembled sensor 74 is illustrated in FIG. 7. As FIG. 7 illustrates, the sheet 110a overlays the sheet 110b, with the center, insulating sheet not illustrated.

The operation of the sensor 74 will now be explained with reference to the sheet 110a, with the understanding that the sheet 110b operates in the same manner. In operation, a regulated DC voltage, $V_{reg}$, is fed to tap 5 of the sheet, while DC ground is fed to tap 2 of the sheet. The resistive compound forms a L-shaped figure along the left and bottom margins of the array of conductive traces 111a. A continuous voltage drop is induced between 113a where tap 5 intersects the resistive compound and 112a where tap 2 intersects the resistive compound. Thus, at any of the conductive traces which intersect the L-shaped resistive pattern between 113a and 112a, a distinct voltage level can be measured which lies between $V_{reg}$ and ground. Such a voltage provides a positional signal corresponding to a point where pressure is applied in the array 111a. For example, consider that the tip 96 contacts the array 111a at 114, and the user applies a force directed onto the sensor 74 at 114. At 114, the composition of the center insulating sheet causes that sheet to become conductive in response to pressure applied by the stylus in the interstice at 114 between conductive traces 115 and 116. The trace 115 intersects the L-shaped resistor at a point indicated by a respective voltage on the trace 115. Conductivity in the insulating layer at 114 causes current to flow between the trace 115 and the trace 116, thereby bringing the trace 116 to the potential of 115. The conductive trace 116 is one of a plurality of conductive traces which alternate with the traces connected to the L-shaped resistor. These alternating traces are connected in common to a trace 117 which is brought out to a tap labeled "X Pos" (for "X position"). In response to the pressure at 114, the voltage induced on the trace 116 is brought out to the X Pos tap; therefore, the voltage level at this tap conveys precisely the location of the tip 96 when pressure is applied to the pen 14. Further, the amount of current which flows between the conductive strips 115 and 116 is directly related to the amount of force exerted at 114 by the tip 96. Therefore, the current at the tap X Pos indicates the amount of pressure on the pen.

Since the sheets 110a and 110b are stacked, with a separating insulating layer which operates as described above, they operate similarly to produce a pair of position signals which, taken together, correspond to the two dimensional position of the pen 14 with respect to the sensor 74. The second position signal is the Y Pos signal taken from the corresponding tap of the sheet 110b. Together, these signals precisely define the instantaneous location of the pen; a continuous signal chronology of these two taps therefor corresponds to an object drawn on the sensor 74 by the pen.

The regulated voltage $V_{reg}$ is brought also to the taps R Key and L Key to energize the conductive traces on the right and left-hand edges, respectively, of the sheets 110a and 110b. Each of these conductive trace patterns is aligned with a corresponding conductive pattern on a facing surface of the other of the two sheets. When the sheets are assembled as in FIG. 7, the right-hand conductive patterns afford sensor arrangements to detect depression of one of a key. For example, with the assembly shown in FIGS. 2 and 7, the right-hand key 16 is positioned above the conductive trace 120. When the key is depressed, the trace pattern 120 is brought into contact with the conductive block 121, with the result a voltage is provided on the tap R middle.

The hand force sensor is illustrated in FIG. 6C and operates in the same manner as the function key sensors. In this regard, refer also to FIG. 4, where the hand-force sensor 80 is shown positioned on the bottom, rear of the circuit board 70 directly over the button 81. In this position, whenever the user applies pressure on the rear portion of the case top 40, the pressure is transferred through the connecting structure of the case 10 to the case bottom and to the attached circuit board, which causes the hand force sensor 80 to press against the button 81. When this occurs, voltage $V_{reg}$ is conducted to the Hand Force tap of the sensor 80.

In FIG. 7, the translational pressure sensor 72 is illustrated. As with the position sensor 74, the translational pressure sensor 72 comprises two sheets with a pattern of conducting traces and a variable resistance pattern. However, on each sheet, the overall pattern is semi-circular. In FIG. 7, only the conductive and variable resistance patterns of the top sheet 150 are visible, it being understood that the bottom sheet a has similar semi-circular conductive/resistive pattern which is rotated 180° with respect to the pattern on the sheet 150 to form a complete circular pattern. These sheets are also assembled on either side of a center insulating sheet (not shown) which becomes conductive in response to application of pressure. On the sheets 150 and 152, $V_{reg}$ is fed to one of the two taps which connect to the semi-circular resistive trace, such as the trace 153, while the other tap is connected to ground. This provides a continuous voltage drop between $V_{reg}$ and ground from one end of the semi-circular arc to the other. The center tap, tap 155 in the sheet 150 and tap 157 in the sheet 152 provide a voltage corresponding to the location on the continuous resistive circle formed by the two opposing semicircular conductive patterns on the sheet 150 and 152.

Pressure on the finger grip 12 is transferred to one or the other of the sheets of the sensor 72 through the disc lever 52. A radial A or B Force signal is generated at tap 155 or tap 157 when the material of the center insulating layer becomes conductive in response to the hand grip pressure. The A or B Force signal indicates position along one of the two semicircular patterns and gives pressure at that point. These two components, of course, define a vector whose function is described below.

The sensors 72 and 74 are attached to the circuit board 70 as illustrated in FIG. 7. Signal connection between the sensors and the outside of the device 10 are by a wiring harness 160. The harness includes individual conductors connected, by conventional solderboard means, to the taps of the sensors 72, 74 and 80. In this manner, $V_{REG}$, common, and ground potentials are connected into the device 10, while the X and Y POS, Right and Left key, Hand Force, and A and B Force signals are conducted from the sensors 72, 74, and 80 out of the device 10.

Referring back to FIG. 1, in the best mode of this invention, conversion and interface electronics are located in an apparatus enclosure 161 and connected to the electronic components of the device 10 by means of the wire harness 160. The wire harness 160 penetrates the device 10 through the case bottom 46 by way of an aperture 47 (FIG. 3). It should be evident, and it is contemplated by the inventors, that all of the circuit functions to be described next can be integrated into monolithic IC form and mounted inside the device 10.

Figure 8:
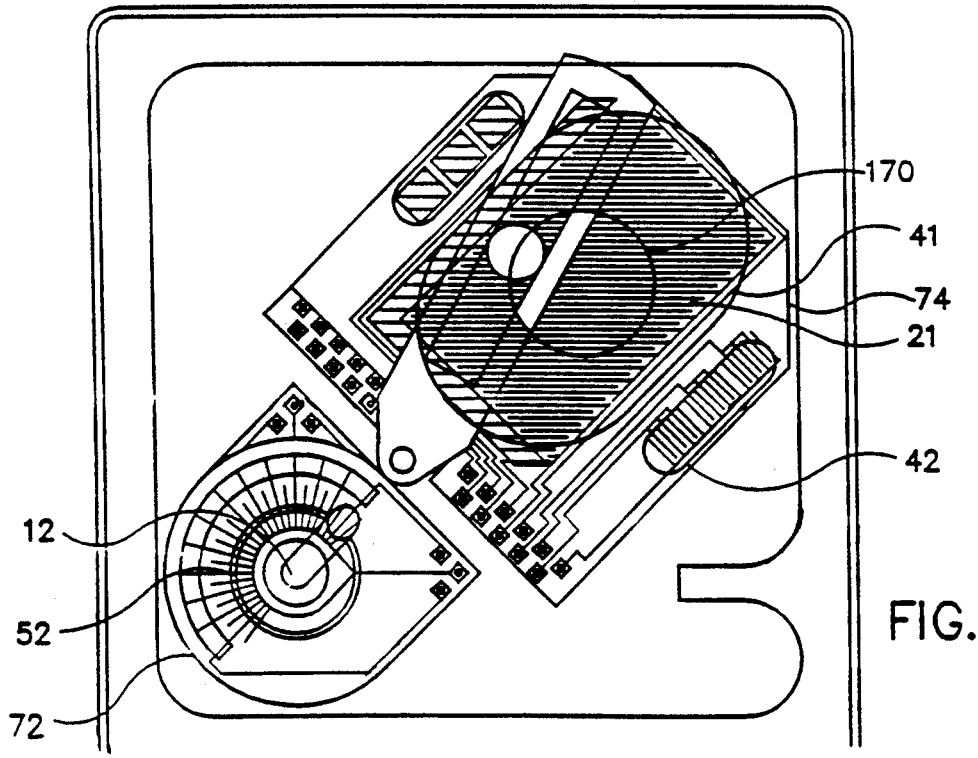
FIG. 8 is a top plan view illustrating the orientation of certain assembly components with respect to the circuit board.

Refer now to FIG. 8 for an understanding of the spatial relationships between the pen assembly and the sensor 74, and the finger grip and the sensor 72. As shown in FIG. 8, when the device 10 is assembled, the circular opening 21 in the carriage 20 is centered in the oval opening 41 of the case top 40. The pivotal connection of the elongate slide 63 and the sliding arrangement between that slide and the round slider 66 permit the tip 96 to be moved by movement of the pen anywhere within the circle defined by the circular opening 21. As FIG. 8 illustrates, this circle is centered in the conductive trace arrays of the sheets making up the sensor 74. In operation, the pen 14 can be moved by the user to draw any kind of a figure within the circle 170, with the time history of the image being available from the X Pos and Y Pos taps on the sensor 74.

The finger grip 12 is aligned with the sensor 72 such that the finger grip assembly, including the disk lever 52, is coaxial with the circular conductivity pattern on sensor 74. As illustrated in FIG. 8, the radius defined by the edge of the disk lever 52 is less than the radius to the circular resistive pattern on the sensor 72. In operation, the finger grip is grasped by the user and force is exerted on it with a component which is radial to the circular conductive pattern of the sensor 72. The radial vector of the force is indicated by the A or B Force signal generated by the sensor 72 in response to the pressure. Thus, if the pressure exerted on the finger grip 12 is toward NNE in FIG. 8, an A Force signal of a particular voltage and current will be generated by the FSR 72 through the tap 155. The magnitude of the voltage is directly related to the direction of the vector, and, therefore, to the direction of the pressure applied to the grip 12. The current is related to the magnitude of the pressure.

Refer now to FIGS. 1, 3, and 8 for an understanding of how the device 10 can be adjusted for the convenience of the user by sliding the carriage 20 either toward or away from the finger grip 12 along the line 175 in FIG. 3. The adjustability is provided to accommodate varying hand dimensions, thereby contributing to the comfort of the user. The carriage 20 slidably engages the case top 40 and can be slid with respect thereto by virtue of the engagement of the case top 40 between the carriage 20 and the retainers 34 and 31 attached to the bottoms of the function key rods 16a and 17a. Three positions are possible: rear, middle, and forward. In the rear position, the carriage 20 is closest to the finger grip 12, and the function keys 16 and 17 are positioned over the lower most conductive traces on the sensor 74. In this position, key signals will be brought out on the tap labeled "R Rear" and "L Rear". When moved to the middle position, the R and L Middle taps provide the function key signals. When the carriage is slid to the position furthest from the finger grip 12, key signals are provided on the R and L FWD taps. In the rear position, ground is provided to tap 3 of both of the conductive sensor portions 110a and 110b. In this position, $V_{reg}$ is provided to tap 4. In the middle position, tap 5 of both sheets is connected to $V_{reg}$ while tap 2 of both sheets is grounded. Last, in the forward position, tap 1 is grounded, while tap 4 receives $V_{reg}$.

As FIG. 8 shows, reconfiguration of tap voltage connections selects the portion of the conductive traces of the sensor 74 which will be positioned under the circular opening 21 defining the drawing area of the pen 14. Although not illustrated in the drawings, conventional mechanical means are used to lock the carriage 20 in a selected position.

Figure 9:
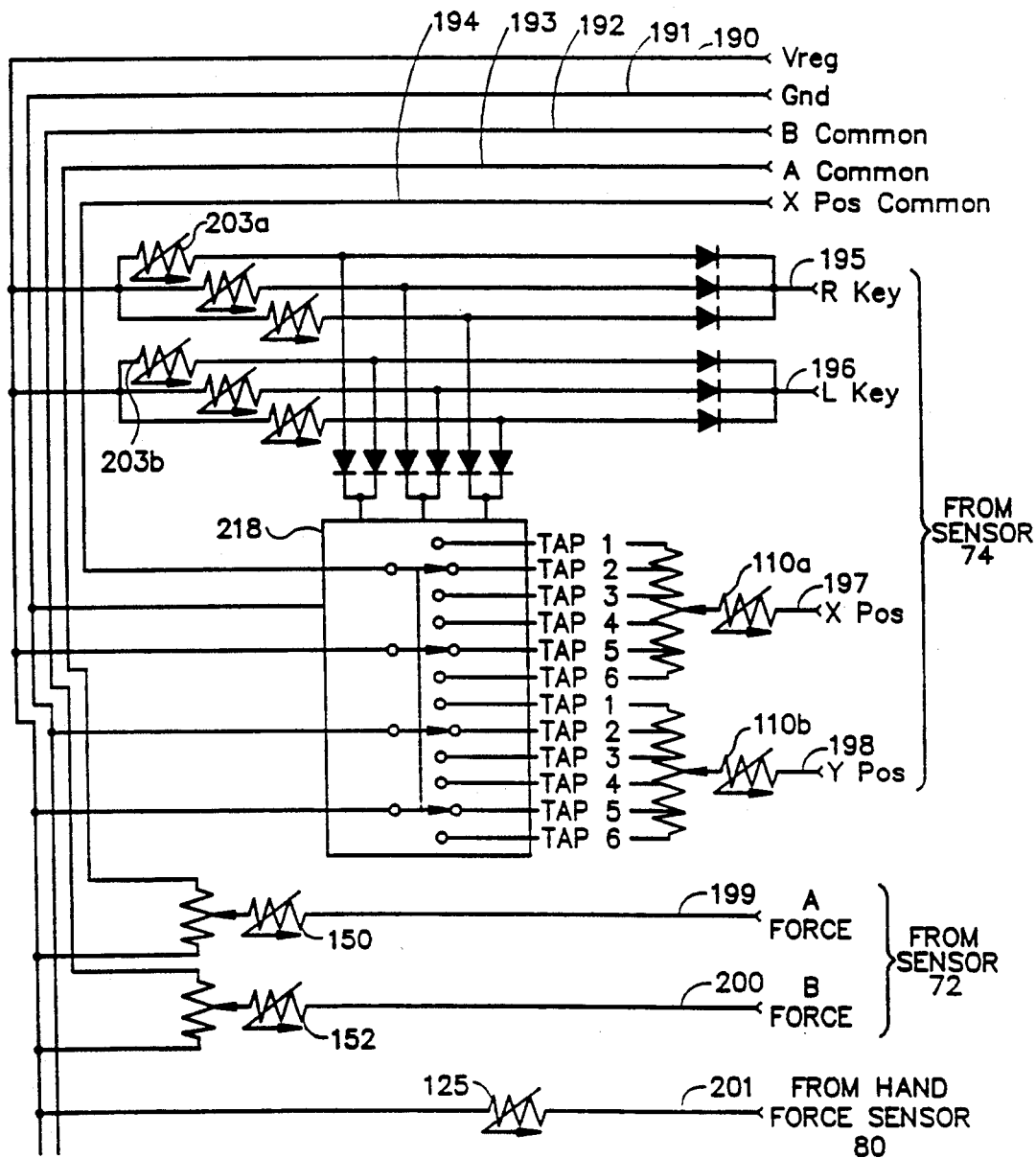
FIG. 9 is a circuit schematic diagram illustrating the electrical operation of the invention in generating position and graphics object input signals to be input to a graphics processor.
Figure 10:
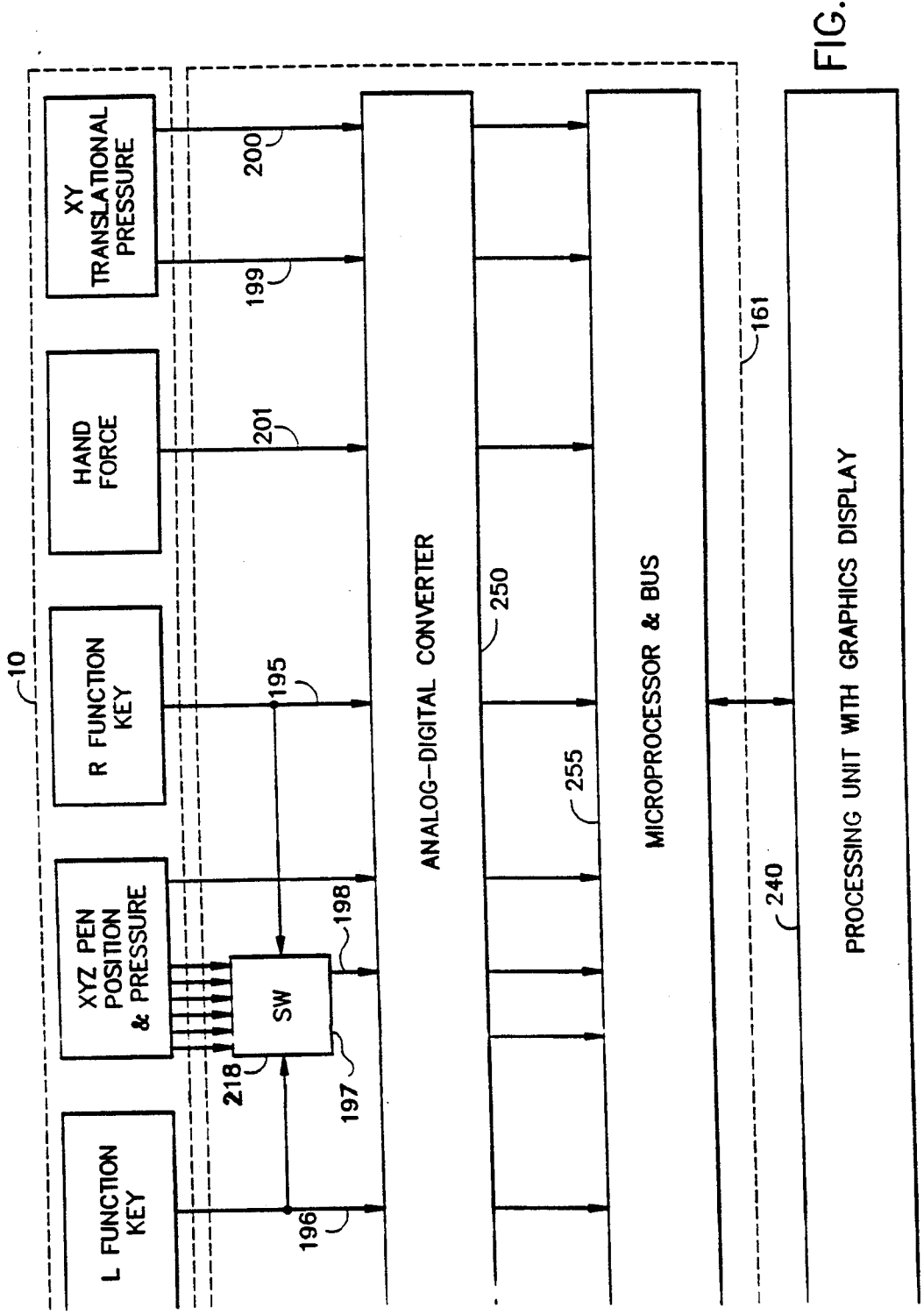
FIG. 10 is a block diagram illustrating the inter-connection of the device with a graphics processor.
Figure 11:
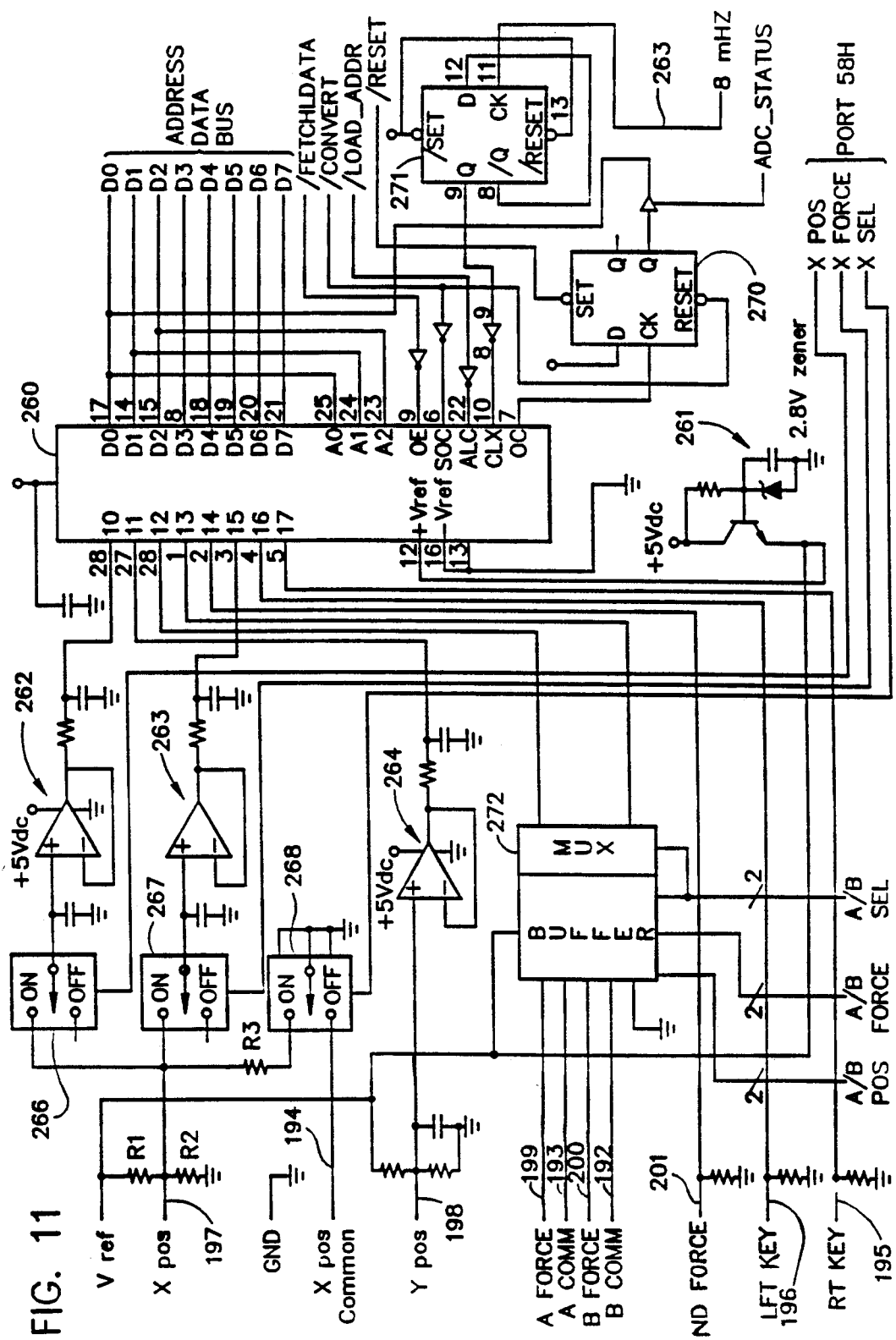
FIG. 11 is a detailed schematic diagram illustrating an analog to digital converter of FIG. 10.

Refer now to FIGS. 9, 10, and 11 for an understanding of the signal conversion and interface circuitry obtained in the electronics enclosure 161 (FIG. 1). FIG. 9 is a schematic diagram which recapitulates the signal path layout discussed above in connection with FIGS. 6A, 6B, 6C, and 7. The $V_{reg}$, common, and ground signals are generated by conventional means, not illustrated, and conducted initially on signal lines 190 and 191, respectively. These lines connect directly to the sensors 72 and 80, and are connected to the sensor 74 by way of a 4-pole, 3-position switch 218. Common signals are brought into the sensor 72 for A and B Force signals, respectively, on respective signal lines 192 and 193. An X position common signal is conducted on signal line 194 to the switch 218 for provision to the sensor 74. The switch 218 is connected to the taps on the sheets comprising the sensor 74 as illustrated. Signal lines 195 and 196, respectively, conduct signals from the sensor 74 to indicate activation of the right or left keys 16 and 17, respectively. Signal lines 197 and 198 conduct X and Y position signals from the sensor 74. Signal lines 199 and 200 conduct the A and B Force signals from the sensor 72, while signal line 201 conducts the Hand Force signal from the sensor 80. When the carriage 20 is in the forward position, the right and left key 16 and 17 are depressed, causing the conductive patterns 203a and 203b in the sensor 74 to conduct, thereby providing a voltage on the right and left key signal lines 195 and 196. In addition, corresponding signals are diode-connected to the switch 218 to configure it such that $V_{reg}$ on signal line 190 is connected to the tap 4 connections of the sensor 74, while ground is connected to tap 1 on sheet 110b and the X common signal to tap 1 on the sheet 110a.

At the middle position, activation of the function keys connects $V_{reg}$ to tap 5 of both sheets of the sensor 74, ground to tap 2 of sheet 110b, and X common to tap of sheet 110a. Last, in the rear position, the function keys operate the switch 218 to connect $V_{reg}$ to tap 6 on sheets 110a and 110b, ground to tap 3 of sheet 110b, and X common to tap 3 of sheet 110a. The sensors 72, 74 and 125 operate as described above to provide the Hand Force, A and B, and X and Y position signals on signal lines 201, 200, 199, 198, and 197, respectively.

FIG. 10 illustrates the means for integrating the integrating graphics input device 10 with a graphics display processor. In FIG. 10, the graphics display processor includes a processing unit with a graphics display 240 which interfaces with the electronics unit 161. The interface between the electronics unit and the device 10 has already been explained above with reference to FIGS. 6A-6C and 9. The primary components in the electronics unit 161 include a circuit 250 for analog-to-digital conversion (ADC) and a microprocessor 255. Essentially, the ADC 250 receives and converts the level signals described above to digital signals, formats the digital signals and provides them to the microprocessor 255. The microprocessor 255 receives the formatted digital signals and conducts a communication process with the processing unit 240 for transfer of those signals to the processing unit for incorporation into a graphics processing application.

Refer now to FIG. 11 for a more detailed illustration of the ADC circuit 250. In FIG. 11, the signal paths 194-199 all correspond to identically-numbered signal paths in FIG. 9. All of these signals are fed to respective input ports of a conventional analog-to-digital converter (ADC) 260. The converter receives a reference voltage for conversion from a reference voltage circuit 261. In addition, the ADC 260 receives the X position signal through a buffer 262, the pen force signal through a buffer 263, and the Y position signal through a buffer 264. The buffers 262 and 263 are both connected, through respective switches 266 and 267 to the signal line 197, which is also connected to a switch 268 The signal line 194 is also connected to the switch 268. The switches 266, 267, and 268 are configured by respective control signals XPOS, XFORCE, and XSEL which are provided from the microprocessor 255. These signals are conventional control signals which condition the switches 266, 267 and 268 to on or off conditions. These signals are provided to multiplex the X Pos signals on signal line 197 to provide both X position information relating to the X position of the pen with respect to the sensor 74, and also to provide the pen pressure signal. For the X position signal, the switches 267 and 268 are conditioned to their OFF states, while the switch 266 is conditioned ON. In this case, the X Pos signal is fed to the buffer 262 for buffering to the ADC 260. In this state, X Pos Common line 194 is grounded to provide a reference for the X Pos signal. Next, the control signals condition the switches 267 and 268 ON and turn OFF the switch 266. In this state, the resistor $R_3$ converts the current input on the signal lead 197 to a voltage signal proportional to the current level, and thus, to the force with which the pen 14 contacts the FSR 74. This signal is buffered to the ADC 260 through the buffer 263.

The Y Pos signal on signal line 198 is fed continuously through the buffer 264 to the ADC 260. The Hand Force signals and the left and right key signals are fed directly, without buffering, to the ADC 260.

The A and B FORCE signals are buffered and multiplexed in a circuit 272. The circuit 272 includes respective buffering sections for the A and B FORCE signals which operate as described above for the X Pos signal to obtain both position and magnitude signals which correspond to the position of the grip 12 with respect to the sensor 72 and to the pressure with which the grip contacts the sensor. The buffers operate in response to the ground, A and B common (COMM), and A/B POS, A/B FORCE, and A/B SEL signals as do the buffers 262 and 263. In addition, the A/B SEL signals operate to multiplex the outputs of the A and B buffers to input pins 12 and 13 of the ADC 260. Thus, for example, when the A buffer is configured to sense position (voltage), the buffer (not shown) which corresponds to buffer 262 is connected to pin 12; when the A buffer senses pressure (current), the buffer (not shown) corresponding to buffer 263 is connected to 12.

The ADC 260 receives a divided clock by way of a conventionally-configured flip-flop 271, reference voltage signals from ground and from the generator 261, and control signals from the microprocessor 255 to conventionally convert the level signals present at its input (I) pins to digital words representative of the converted levels at the output (D) pins. The output (D) pins of the ADC 260 are connected to an address-/databus which shares, with the output pins, common connections with three address (A) pins of the ADC 260. In operation, the microprocessor 255 conventionally controls the ADC with FETCH_DATA, CONVERT, LOAD_ADDR, and RESET control signals. These signals are conventional and operate the ADC 260 to sequentially address input pins, sample the voltage at the currently-addressed input pin, and output a digital word corresponding to the level of the voltage sampled at the currently-addressed input pin. The address is then changed to the next input pin, and so on. In synchronism with the sampling sequence, the microprocessor 255 configures the switches 266, 267, and 268 to ensure that, for example, when pin 10 is addressed, the X Pos voltage signal is buffered through the buffer 262. Similarly, when the input pin Il is addressed, the switches 266, 267, and 268 are configured to provide the pen pressure current through the current buffer 263.

Further, when A or B FORCE signals are being sensed, the ADC 260 is similarly addressed and controlled, in synchronism with the multiplexing of the circuit 272, to sample and convert A position and A force magnitude signals through pin 12, and B position and B force magnitude signals through pin 13.

Refer now to FIG. 11 and to Tables I-IV for an understanding of how the operation of the ADC 260 is controlled to convert the signals produced by the FSR's 72, 74, and 80. In Table I, a series of functions and global variables are defined. Then, in a main loop, the converter 260 is interrogated in a sequence of calls to 3 subroutines: ADCSTB, ADCSTAT, and ADCDATA (Tables II, III, and IV, respectively).

Interwoven with the call sequence of Table I is a control sequence for conditioning the three switches 266, 267 and 268 for reading either X Pos or the pen downforce signal output by the sensor 74. The control sequence also conditions the A/B POS, -FORCE, and -SEL signals to read A position, A magnitude, B position, and B magnitude signals output by the sensor 72.

Initially, a main loop is defined in step 116, conditions are initialized in steps 117-119, and in step 120, the XPOS, APOS and BPOS signals are energized. Activation of XPOS to turn ON the switch 266. Concurrently, the switch 268 is OFF grounding the XPOS Common line 194, which provides a ground potential against which the X position information is measured by the buffer 263. The control signals are hexadecimal (H) signals which are output through microprocessor port 58H. The A and B POS signals similarly configure the buffer sections of circuit 272.

Next, a loop index (i) is defined, initialized to zero, limited to the range of whole numbers between 0 and 10 and incremented by 1 for each step of a looped sequence beginning at line 124 of Table I. A byte-wide 10-position buffer is initialized in step 124 and then an endless loop entered in steps 125 and 126. In steps 127-130, the X position of the pen 14 is obtained by conversion of the X Pos signal on the path 267, 263, 260 in FIG. 11. First, the ADCSTB macro (Table II) is called. This macro provides an address (ADDRESS 0 in line 128) on the address databus connected to the ADC 260, a LOAD_ADDR control signal to the ADC 260 notifying it to load the address on the address/databus, and then a CONVERT (ADC STROBE) control signal commanding the ADC 260 to begin its procedure of converting the level of the signal on the input port addressed on the address/databus. The addressed input port is I0, connected to the buffer 262. Therefore, the X Pos signal is converted to digital format by the ADC 260.

The ADC 260 operates conventionally to provide an end of conversion (EOC signal) which sets a status flip-flop 270. This conditions an ADC_STATUS signal to an ON state. When the ADC_STATUS signal is conditioned ON, the ADC DATA macro (Table IV) is dispatched, which reads the converted data off of the address/databus, and resets the status flip-flop 270 via the RESET signal. The data which is converted from the signal input at ADC 10 is entered into location {0} in the buffer.

Following conversion and buffering of the X PPS signal, a hexidecimal code '80' is provided through processor port 58H, which turns OFF switch 266, while turning 268 ON. This "floats" the signal line 174, while pulling down the signal line 197 through the parallel resistances R2 and R3.

Next, in steps 135-143, the A and B position signals are sampled in the same manner as the X position signal, and placed in buffer locations 3 and 4. The ASEL and BSEL signals are not active, which appropriately connects the buffered versions of the position signals to the ADC 260 through the multiplexing section of the circuit 272. Then, in step 144, the APOS and BPOS signals are deactivated while the ASEL and BSEL signals are activated.

Then, in steps 145-148, the Y position buffer 264 is addressed via the ADC 260, the Y position signal is converted and sent to buffer location 1. The A and B FORCE signals are activated in step 149. Next, in steps 150-153, the Hand Force signal on signal line 199 is converted and placed in buffer location 5.

By the time the program in Table I reaches steps 150-153, the switches 266, 267, and 268 have been turned OFF, ON, and ON, respectively, in enough time to damp out any switch bounce. Now, in steps 154-157, the pen downforce signal is provided through the buffer 263, converted, and stored in buffer location 2. In program line 158, all of the switches 266, 267, and 268 are turned OFF, while the ASEL, BSEL, A FORCE, and B FORCE signals are activated. Then, A FORCE, B FORCE and left button signals are converted in steps 159-171. In step 171a, the XPOS signal is activated together with the APOS and BPOS signals, turning ON the switch 266, and preparing the buffer 262 for X Pos, A Pos, and B Pos conversion. Following this, the right button status is converted and stored in buffer location 7 in program steps 172-176. The program loops, at step 177 back to step 125.

Reference is now made to lines 129, 138, 142, 150, 154, 162, 166, and 174 of Table I, all of which call a TESTXMIT subroutine. The TESTXMIT subroutine is called and executed while the ADC is conducting a conversion process. Thus, until the ADC_STATUS bit is set, Table I executes the TESTXMIT subroutine. The TESTXMIT subroutine polls the host graphics processing unit 240 for a communications initiation handshake signal. When it detects a "start" handshake signal from the host, it transmits 10 bytes of data by transferring the contents of the 10-position buffer which is loaded as described above to a transmit buffer (XMITBUF). Transmission is based upon availability of the transmit buffer, which is determined by availability of a serial I/O channel. The availability is tested in steps 183 and 185. If available, the subroutine SENDSTR is invoked to transmit a string of 10 bytes from the transmit buffer through a serial I/O port to the graphics processing unit 240.

Figure 12:
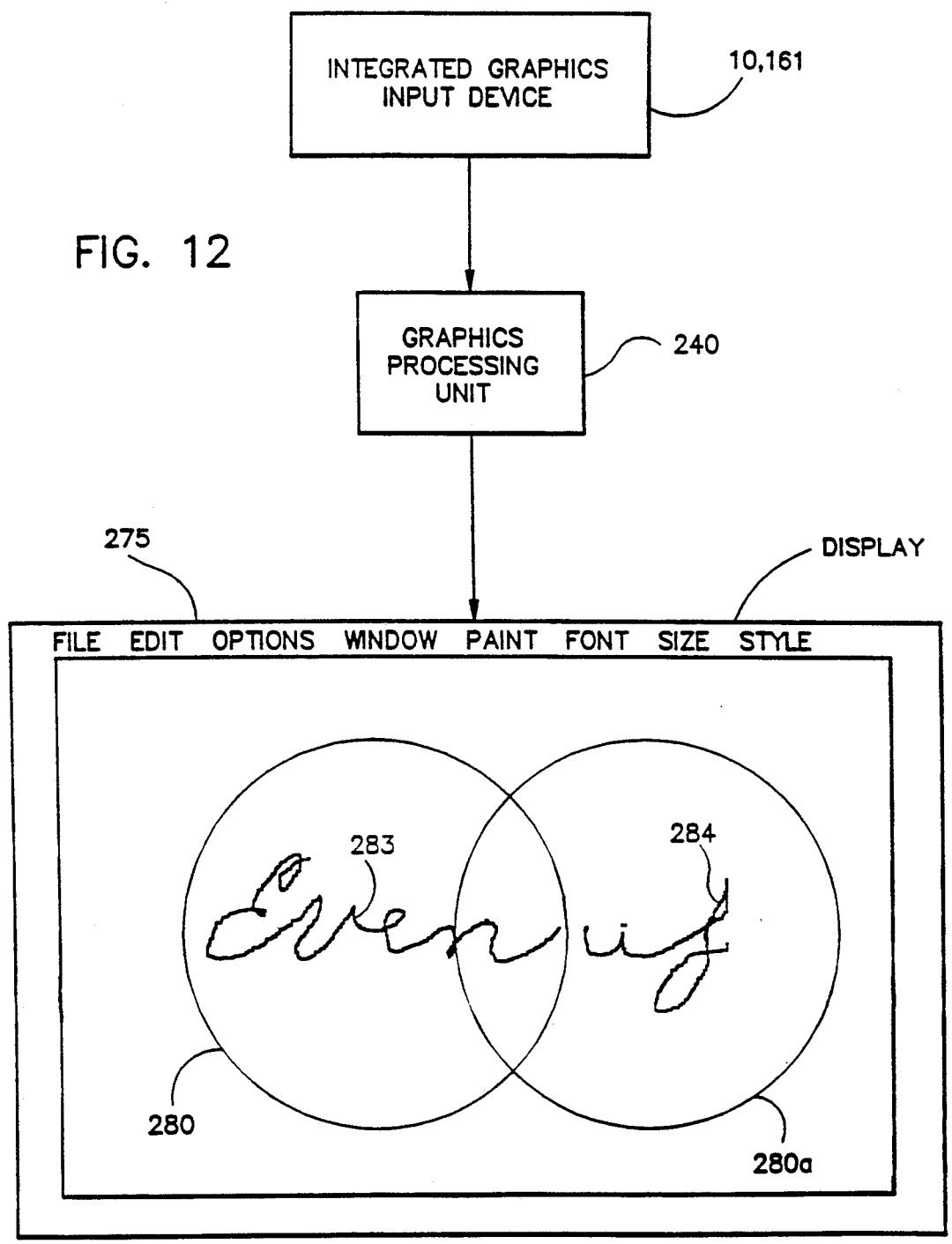
FIG. 12 illustrates the response of the graphics processor of FIG. 10 to the signals input by the device of FIG. 1.

The reaction of the graphics processing unit 240 to the position, hand force and function key signals generated by the device 10 and converted through electronics 161 is illustrated in FIG. 12.

As FIG. 12 illustrates, the graphics processing unit 240 operates a conventional display 275 which may comprise a CRT. The graphics processing unit 240 includes a dispatchable graphic input device handler (not shown) which receives the converted signals from the electronics 161, and passes them to a graphics processor (now shown) for driving a display. The user of the device 10 is enabled by the graphics processing unit 240 to observe a drawing being made on the display 275 by means of the input device 10. In this regard, the graphics processing unit 240 provides a defined position area showing the user where, on the image being displayed, the drawing input from use of the pen is being entered. In FIG. 12, this area is displayed as a circle 280, corresponding to the circle 21 (FIG. 1) within which the pen 14 is constrained to move. The circle 280 is repositioned on the display by use of the hand grip 12, unless the Hand Force sensor 80 signal is activated by pressure on the case top. When the user wishes to reposition the position circle 280, the user reduces pressure from the back of the case 11, thereby reducing the current on the hand force sensor 80 resulting from pressure against the button 81 on the rear bottom of the device (FIG. 4). This signals to the processing unit 240 that the position circle 280 allowing it to be moved ("dragged") on the screen of the display 275 in a direction corresponding to the A or B Hand Force signal derived from the sensor 72. The circle 280 is moved in the direction corresponding to the active A or B position and at a rate corresponding to the A or B force signal until horizontal pressure on the finger grip 12 is released. The position circle 280 is then kept at the last updated X-Y position. In FIG. 12, the updated X-Y position is indicated by 280a.

While positioned on the display 275, the position circle 280 defines an aperture into the image being drawn on the display through which the user can enter X and Y position signals, together with pen force signals, to create a graphics object for display on the screen. This is illustrated in FIG. 12, where the scripted word "Even" 283 has been entered into the image on the display 275 by use of the pen 14 while the position circle is in the position indicated by 280. The word 283 represents the trace of the tip of the pen 14. This trace is provided by continuous transmission of X and Y POS signals to the graphics processor as described above. The width, or density, of the graphics object 283 which traces the path of the pen tip is given by the sequence of hand down force signals transmitted with the X and Y position signals Movement of the position circle 280a in response to use of the grip repositions the aperture in the displayed image. In the repositioned position circle, the scripted word "if" has been entered into the image.

Thus, by moving the position circle 280 in a particular sequence of overlapping location, the user of the device 10 can selectively create a graphics object using the graphics processing unit 240, and enjoy instantaneous visual feedback of the object during the process of creation.

The design of the device 70 is intended to position the stylus 14 and grip 12 so that they can be enclosed in the span of a user's hand and operated simultaneously. This permits simultaneous input of graphics signals and force signals to reposition the drawing area enclosed in the position circle. When only graphics signals are to be input, force signals are locked out by applying sufficient hand force to the rear of the upper case to exceed a preset force. This can be applied by the rear of the hand being used to operate the stylus.

TABLE I

```
60   *function of switch bits:
61   *80h = x select
62   *40h = x pos
63   *20h = x force
64   *10h = (not assigned)
65   * 8h = a,b select
66   * 4h = a,b pos
67   * 2h = a,b force
68   * 1h = (not assigned)
69   *
70   *ADC converter inputs:
71   * 0 = x sensor position
72   * 1 = y sensor position
73   * 2 = 'A' sensor pos/force
74   * 3 = 'B' sensor pos/force
75   * 4 = hand force
76   * 5 = x sensor force
77   * 6 = left button
78   * 7 = right button
79   *
80   *xmit order:
81   * 0 = x pen pos
82   * 1 = y pen pos
83   * 2 = pen downforce
84   * 3 = 'A' sensor position
85   * 4 = 'B' sensor position
86   * 5 = hand downforce
87   * 6 = left button
88   * 7 = right button
89   * 8 = 'A' sensor force
90   * 9 = 'B' sensor force
100  #define void int
101  #define FORCE 0
102  #define POSITION 1
103  #define XON '021'
     /* ---- function defs ---- */
104  void init();              /*initialize SIO */
105  void testxmit();           /*test request to xmit */
106  void sendstr();            /*transmit result string*/
107  int getstat();             /*!0 if char avail */
108  int getchr();              /*char in lower byte */
109  void settmr();             /*set timer */
110  unsigned int gettmr();     /*get current timer value */
111  void adcstb();             /*start adc cycle */
112  int adcstat();             /*get adc status */
113  unsigned int adcdata();    /*get adc data */
114  void setswit();            /*set control bits */
     /* ---- global vars ----*/
115  static char buffer (10)    /* value buffer */
116  main()
117  {
118  static int i;              /*counter */
119    init(0;                  /*init SIOs */
120    setswit(0x44);           /*set switches */
123    for (i = 0; i < 10; ++i)
124      buffer(i) = 0;
125    for (;;)
126    {
       /* x axis pen position */
127    adcstb(0);                /*start conversion */
128    while (adcstat (0))
                                 /*wait till conversion done */
129      testxmit();
130      buffer(0) = adcdata(0); /*get adc data */
131      setswit(0x84);          /*set switches */
135    /* A sensor position */
136    adcstb(2);                /*start conversion */
137    while (adcstat(2))
                                 /*wait till conversion done */
138      testxmit();
139      buffer(3) = adcdata(2);
       /* B sensor position */
140    adcstb(3);                /*start conversion */
141    while (adcstat(3))
                                 /*wait till conversion done */
142      testxmit();
143      buffer(4) = adcdata(3);
144      setswit(0x88);          /*set switches */
       /* y axis pen posiion */
145    adcstb(1);                /*start conversion */
146    while (adcstat(1))
                                 /*wait till conversion done */
147      testxmit();
148      buffer(1) = adcdata(1);
149      setswit(0xAA);          /*set switches */
       /* hand downforce */
150    adcstb(4);                /*start conversion */
151    while (adcstat(4))
                                 /*wait till conversion done */
152      testxmit();
153      buffer(5) = adcdata(4);
       /* pen downforce */
154    adcstb(5);                /*start conversion */
155    while (adcstat(5))
                                 /*wait till conversion done */
156      testxmit();
157      buffer(2) = adcdata(5);
158      setswit(0x0A);          /*set switches */
       /* 'A' sensor force */
159    adcstb(2);                /*start conversion */
160    while (adcstat(2))
                                 /*wait till conversion done */
161      testxmit();
162      buffer(8) = adcdata(2);
       /* 'B' sensor force */
163    adcstb(3);                /*start conversion */
164    while (adcstat(3))
                                 /*wait till conversion done*/
165      testxmit();
166      buffer(9) = adcdata(3);
167      setswit(0x00);          /*set switches */
       /* left key */
168    adcstb(6);                /*start conversion */
169    while (adcstat(6))
                                 /*wait till conversion done */
170      testxmit();
171      buffer(6) = adcdata(6);
171a     setswit(0x44);          /*set switches */
       /* right button */
172    adcstb(7);                /*start conversion */
173    while (adcstat(7))
                                 /*wait till conversion done */
174      testxmit();
175      buffer(7) = adcdata(7);
176    }
177  }
178  void testxmit()
179  {
180  static int i;              /*counter */
181  static char xmitbuf(10);   /*local buffer */
182  static char *cp;           /*pointer to chars */
183    if (!getstat())          /*char not available? */
184      return;
185    if (getchr() != XON)     /*char not 'start char'? */
186      return
187    for (i=0; i<10;++i)      /Ixfer data to local buffer */
188      xmitbuf(i)=buffer(i);
```

TABLE I-continued

```
189      sendstr(xmitbuf,8);
190}
```

TABLE II

| ADCSTB | :POP  | b     | ;(RETURN ADDRESS) |
|        | POP   | h     | ;CHANNEL NUMBER   |
|        | PUSH  | h     | ;(RESTORE STACK)  |
|        | PUSH  | b     |                   |
|        | MOV   | a,    | ;ADDRESS          |
|        | OUT   | ADCLD | ;ADC ADDRESS LOAD |
|        | OUT   | ADCCV | ;ADC STROBE       |
|        | RET   |       |                   |

TABLE III

| ASCSTAT | :IN  | ADCST    | ;GET SONAR STATUS |
|         | ANI  | 00000001B| ;ADC ONLY         |
|         | MOV  | l,a      | ;RETURN STATUS    |
|         | MVI  | h,0      |                   |
|         | RET  |          |                   |

TABLE IV

| ADCDATA | :IN  | ADCDA | ;GET DATA    |
|         | MOV  | L,A   | ;RETURN DATA |
|         | MVI  | H,O   |              |
|         | RET  |       |              |
|         | END  | START |              |

While we have described several preferred embodiments of our integrating graphics input device, it should be understood that modifications and adaptations thereof will occur to persons skilled in the art. Therefore, the protection afforded our invention should only be limited in accordance with the scope of the following claims.

I claim:

1. A graphics entry apparatus comprising:
   a case assembly, the case assembly including:
      a case top having two spaced-apart apertures; and
      a case bottom fixed to the case top to form an enclosure therewith;
   a carriage assembly positioned on the case top over a first aperture, the carriage assembly including a graphics entry aperture of predetermined shape which is substantially aligned with the first aperture;
   a hand grip mounted to the case top over a second aperture;
   means for slideably retaining the carriage assembly on the case top for movement substantially toward and away from the hand grip;
   a stylus with a tip;
   means acting between the case assembly and the graphics entry aperture for retaining the stylus in the case assembly for sliding two-dimensional movement within the graphics entry aperture;
   a first flat, substantially two-dimensional sensing means enclosed in the case assembly for generating graphics input signals in response to movement of the stylus tip, the graphics input signals being indicative of a trace of the movement of the stylus tip on the first sensing means; and
   the means for retaining further for retaining the stylus tip in sliding two-dimensional contact with the first sensing means;
   second flat, substantially two-dimensional sensing means in the case assembly in contact with the hand grip through the second aperture for generating aperture relocation signals in response to pressure on the hand grip.

2. The graphic entry apparatus of claim 1, further including one or more function keys mounted on the carriage assembly.

3. The graphics entry apparatus of claim 1, wherein the means for slideably retaining include:
   an elongate slide having two ends, one end pivotally attached in the case assembly enclosure between the case top and the case bottom such that the second end can be moved arcuately over the first sensing means, and an elongate slot extending between the first and second ends;
   a slider slideably retained in the elongate slot, the slider having first and second recessed ends;
   a slider tip, slideably disposed in the slider and extending through the second recessed end of the slider;
   means in the slider for springably retaining the slider tip in contact with the first sensing means; and
   a spring connecting the stylus tip to the first recessed end of the slider.

4. The graphics entry apparatus of claim 1, wherein the means acting between the case top and the graphics entry aperture includes a boot mounted in the graphics entry aperture, the boot including a central aperture through which the stylus extends.

5. The graphics entry apparatus of claim 1, wherein the first sensing means is further for generating Z-axis signals indicative of the magnitude of pressure on the stylus.

6. The graphics entry apparatus of claim 1, further including a ramped surface on the case bottom in the enclosure, the first sensing means being mounted on the ramped surface.

7. The apparatus of claim 6, further including one or more function keys mounted on a carriage assembly.

8. The graphics entry apparatus of claim 7, wherein the means acting between the case top and the graphics aperture includes a boot mounted in the graphics entry aperture, the boot including a central aperture through which the stylus extends.

9. The graphics entry apparatus of claim 8, wherein the mans for slideably retaining includes:
   an elongate slide having two ends, one end pivotally attached in the case assembly enclosure between the case top and the case bottom such that the second end can be moved arcuately over the first sensing means, and an elongate slot extending between the first and second ends;
   a slider slideably retained in the elongate slot, the slider having first and second recessed ends;
   a slider tip, slideably disposed in the slider and extending through the second recessed end of the slider;
   means in the slider for springably retaining the slider tip in contact with the first sensing means; and
   a spring connecting the stylus tip to the first recessed end of the slider.

10. The graphics entry apparatus of claim 3, wherein the first sensing means is further for generating Z-axis signals indicative of the magnitude of pressure on the stylus.

* * * * *